A. C. REID.
TELEPHONE SYSTEM.
APPLICATION FILED OCT. 31, 1918.
1,413,782.
Patented Apr. 25, 1922.
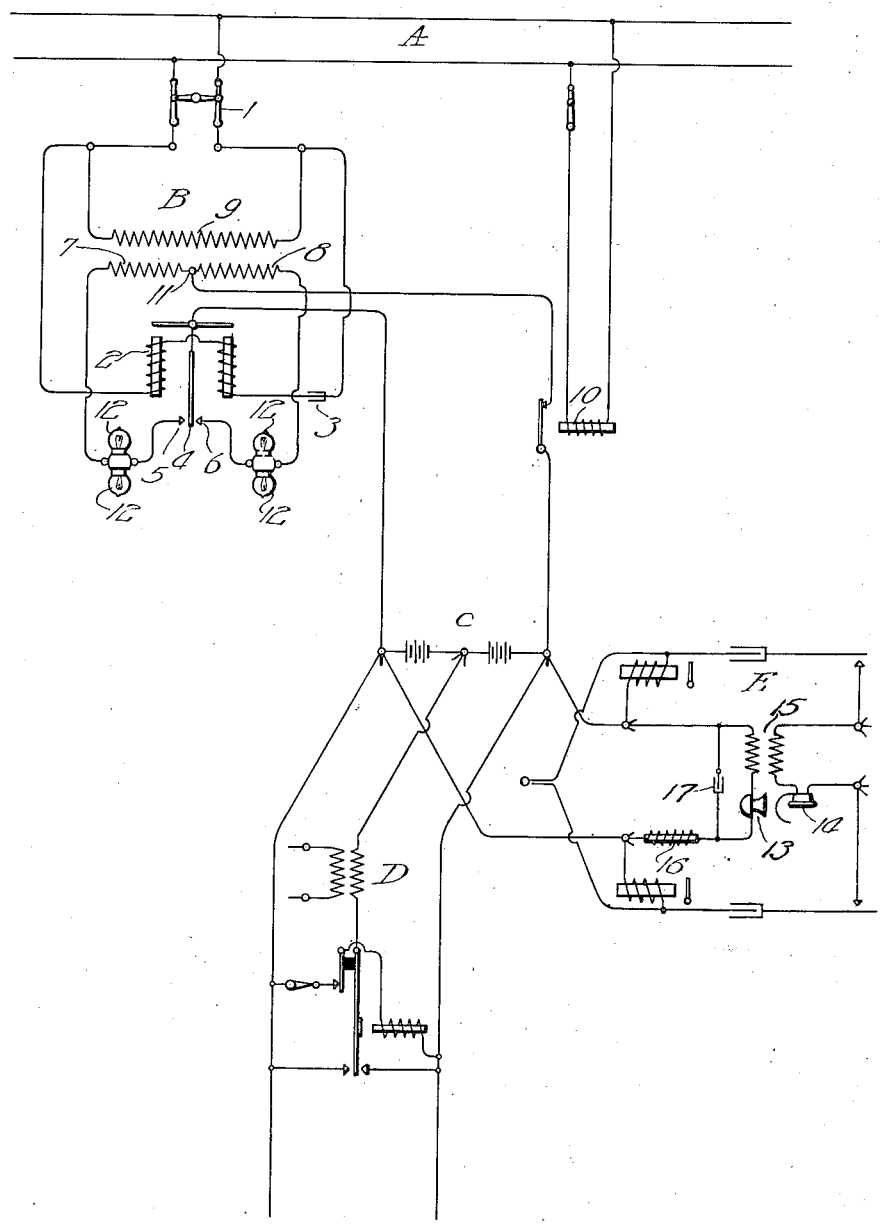

UNITED STATES PATENT OFFICE.

ALEXANDER C. REID, OF GENOA, ILLINOIS, ASSIGNOR TO LEICH ELECTRIC COMPANY, OF GENOA, ILLINOIS.

TELEPHONE SYSTEM.

1,413,782.   Specification of Letters Patent.   Patented Apr. 25, 1922.

Application filed October 31, 1918. Serial No. 260,418.

*To all whom it may concern:*

Be it known that I, ALEXANDER C. REID, a citizen of the United States, residing at Genoa, in the county of De Kalb and State of Illinois, have invented a certain new and useful Improvement in Telephone Systems, of which the following is a full, clear, concise, and exact description, reference being had to the accompanying drawings, forming a part of this specification.

My invention relates to telephone systems, an object being to provide an improved and simplified operating arrangement in which a vibratory rectifier is operated from an alternating current supply circuit for charging a storage battery to which various consumption circuits are connected including operators' transmission circuits, the arrangement being such that the rectified current for charging the storage battery does not materially affect the transmission circuit although both are connected across the terminals of the battery.

In telephone exchanges, and particularly in small exchanges of not many lines, it is, of course, important to reduce the initial cost and maintenance to the lowest point consistent with proper operation, and in such exchanges the use of a single storage battery set instead of two amounts to a considerable saving. Where a single storage battery is provided for supplying current to various consumption circuits, as voice transmission and other circuits, charging of the battery during their use must be such that the variation in voltage across the battery terminals during charging is not sufficient to cause objectional noises in the voice transmission circuits, and particularly where the charging set consists of a rectifier supplying uni-directional impulses of current.

One of the features of the present invention is the use of a vibratory rectifier driven from a main alternating current supply circuit for providing a substantially continual charge for the storage battery, the storage battery having the various consumption circuits including voice transmission circuits, connected across its terminals, and in which the normal charging rate of the rectifier is slightly in excess of the average rate of use of the consumption circuits but less than the current consumption at higher loads, also the charging rate is sufficiently low and is so controlled as to prevent disturbances in the voice transmission circuits. Thus the rectifier may operate practically continually and maintain the battery sufficiently charged, but without interfering with the proper operation of the circuits.

In the accompanying drawing I have illustrated one form of my invention in which an alternating current supply circuit A is provided, having attached thereto the vibratory rectifier B adapted to charge a storage battery C across the terminals of which are connected consumption circuits including one or more converters D for providing ringing current for the exchange, and one or more voice transmission circuits E.

Referring now more in particular to my invention as illustrated, the rectifier B is connected to an alternating main through the usual switch 1, the rectifier being preferably in the form of a vibratory device consisting of a polarized electromagnet which is connected across the main A through a condenser 3 adapted to keep the armature in proper phase with the supply circuit.

The rectifier B has a vibratory contact 4 adapted to alternately engage stationary contacts 5, 6 which are connected to the terminals of the secondary windings 7, 8 of a transformer. This transformer has a primary winding 9 connecting across the alternating current main. A storage battery C is connected across the rectifier, the circuit being through the contacts of a circuit breaker 10 and between the vibratory contact 4 and a point 11 between the secondary windings 7, 8. As the contact 4 alternately engages the stationary contacts 5, 6 charging impulses of current are transmitted to the storage battery C. The circuit breaker 10 is maintained closed as long as current is flowing in the main but if this is stopped, the circuit breaker opens the battery lead so that the battery will not discharge.

Now in order to regulate the charging rate and prevent undue disturbance I provide resistances, preferably in the form of lamps 12, each pair being connected in multiple sockets so that the charging rate may be regulated to a point slightly in excess of the average rate of use of current from the storage battery C but preferably less than the current consumption at higher loads. In other words, assuming the rectifier B is operated for practically twenty-four hours a day, it is so adjusted that the total output is only enough higher than the output of the storage battery during the same period to keep the battery charged and take care of the current loss.

The storage battery C is adapted to supply current to various consumption circuits such as one or more vibratory converters D which supply ringing current for operating the bells on the telephone lines extending from the exchange. These converters may be of the ordinary harmonic type in which case the number provided depends upon the number of frequencies used.

Heretofore voice transmission circuits have not been connected across the regular storage batteries so that they could be employed during charging of the battery where pulsating current is used for charging, because of the fact that the voltage variation across the battery terminals during the charging would cause noise in the voice transmission circuits. In the present case, however, I connect the voice transmission circuits directly across the battery terminals, one circuit arrangement consisting of the usual operator's cord circuits each having the usual transmitter 13, receiver 14, and induction coil 15, the primary winding of which is connected in series with a suitable impedance coil 16. A condenser 17 is also connected across the transmitter. There may be a number of such circuits as indicated by the common connections at the leads running to the battery.

With the circuit arrangement of my invention as shown, it will be understood that although the transmission circuits are connected across the battery terminals during the continual charging thereof, no undue disturbance of the transmission circuit is permitted. To assist in avoiding undue interference, resistances 12 are provided which control the form of the charging current waves. Now in order to obtain a certain average charging current, it is necessary to use a charging supply voltage in excess of the battery voltage. The peak of this voltage wave is much higher than the average voltage in order to provide a large current during the period that the rectifier is making contact.

When resistances are not used in the charging circuit, the rectifier makes contact when the charging voltage is at or near the battery voltage. The current rises to a peak conforming to the voltage wave and decreases to a point at or near the battery voltage when the contact is broken at the rectifier.

When resistances are used an altogether different condition obtains. An average charging current voltage 100 to 200% in excess of the battery voltage may be used. As a result the rectifier contact can be closed earlier in the voltage wave period preventing an abrupt rise in the charging current wave. Owing to the resistances being the controlling factors in the circuit, this current wave is not peaked as is the case without resistances but is smoothed out to a point where no undue disturbance is caused in the voice transmission circuits.

I am well aware of the fact that electromagnetic resistance in the form of impedance has been employed to smooth out the current wave of gas bulb and mercury arc rectifiers but such means should not be employed on vibratory rectifiers as destructive arcing would occur at the rectifier contacts. Although I preferably operate the rectifier B substantially continually, because by so doing a lower charging rate may be used, if desired, the charging rate may be increased so that the rectifier B is operated for shorter periods.

It will also be apparent that in using a pulsating rectifier like B, and particularly if only one-half of the complete cycle acts for charging as when only one contact 5 or 6 is connected across the battery terminals, this pulsating charging current is across the transmission circuit as well as across the battery.

However to obtain an average charging current equal to that obtained when both half waves are used, a large impulse of current is necessary. Such a condition, though, causes no undue disturbance when controlled by suitable resistances as described.

Where the exchange is operated during twenty-four hours of each day, the lowest charging rate could, of course, be maintained by also operating the rectifier for practically twenty-four hours each day. With the exchange operating fewer hours each day, if desired, the rectifier may be operated for comparatively shorter periods.

I claim:

1. In a telephone system, an alternating current supply circuit, a vibratory rectifier, a storage battery under charge of the rectifier, consumption circuits connected to said battery including an operator's transmitter circuit, the peak voltage of the rectifier being slightly above the battery voltage and the normal charging rate of the rectifier being slightly in excess of the average rate of use of the consumption circuits.

2. In a telephone system, an alternating current supply circuit, a vibratory rectifier, a storage battery under substantially continual charge of the rectifier, consumption circuits connected to said battery including an operator's transmitter circuit, the peak voltage of the rectifier being slightly above the battery voltage and the normal charging rate of the rectifier being slightly in excess of the average rate of use of the consumption circuits but less than the current consumption at higher loads.

3. In a telephone system, an alternating current supply circuit, a multiple path vibratory rectifier, a storage battery under substantially continual charge of the rectifier, consumption circuits connected to said battery including an operator's transmitter circuit, and means for adjusting the charging voltage and the charging rate of the rectifier so as to maintain the charging rate slightly in excess of the average rate of use of the consumption circuits but less than the current consumption at higher loads.

4. In a telephone system, an alternating current supply circuit, a vibratory rectifier, a consumption circuit across the rectifier including an operator's transmitter circuit, an equalizer battery across the terminals of the rectifier and consumption circuit, and means for adjusting the charging voltage and charging rate of the rectifier so as to be slightly in excess of the average rate of use of the consumption circuit but sufficiently low to prevent disturbances in the operator's transmitter circuit.

5. In a telephone system, an alternating current supply circuit, a vibratory rectifier, a storage battery under charge of the rectifier, consumption circuits connected across the storage battery including an operator's transmitter circuit, and means for regulating the charging voltage and the normal charging rate of the rectifier so as to be slightly in excess of the average rate of use of the consumption circuits but lower than the current consumption at higher loads.

6. In a telephone system, an alternating current supply circuit, a vibratory rectifier having alternate circuit closing contacts, a storage battery under charge of the rectifier, consumption circuits connected across the battery including an operator's transmitter circuit, and means including a plurality of independently multiply connectible lamps in circuit relation with each of said contacts for regulating the charging voltage and charging rate of the rectifier so as to be slightly in excess of the battery voltage and average rate of use of the consumption circuits but sufficiently low to prevent disturbances in the operator's transmitter circuit.

In witness whereof, I hereunto subscribe my name this 23rd day of Sept. A. D., 1918.

ALEXANDER C. REID.